United States Patent [19]
Nayebi et al.

[11] Patent Number: 6,018,370
[45] Date of Patent: Jan. 25, 2000

[54] CURRENT SOURCE AND THRESHOLD VOLTAGE GENERATION METHOD AND APPARATUS FOR HHK VIDEO CIRCUIT

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 08/848,387

[22] Filed: May 8, 1997

[51] Int. Cl.[7] .................. H04N 5/10; H04N 5/08
[52] U.S. Cl. .............. 348/525; 348/531; 348/521; 348/500; 327/538
[58] Field of Search .................. 348/525, 529, 348/530, 531, 532, 533, 534, 528, 500, 521; 327/538; 323/312, 315, 316, 317; H04N 5/10, 5/08

[56] References Cited

U.S. PATENT DOCUMENTS

| | | | |
|---|---|---|---|
| 3,569,844 | 3/1971 | Lynn | 328/151 |
| 3,626,209 | 12/1971 | Chandos | 307/268 |
| 3,639,780 | 2/1972 | Lovelace | 307/235 |
| 3,639,786 | 2/1972 | Lovelace | 307/303 |
| 3,883,756 | 5/1975 | Dragon | 307/265 |
| 3,898,377 | 8/1975 | Fairbairn et al. | 178/6 |
| 4,064,541 | 12/1977 | Schneider et al. | 358/153 |
| 4,100,575 | 7/1978 | Morio et al. | 358/120 |
| 4,115,800 | 9/1978 | Sakamoto | 358/8 |
| 4,166,250 | 8/1979 | Meki et al. | 328/165 |
| 4,251,743 | 2/1981 | Hareyama | 307/297 |
| 4,275,420 | 6/1981 | Yamada et al. | 358/167 |
| 4,282,549 | 8/1981 | Balaban et al. | 358/150 |
| 4,292,654 | 9/1981 | Steckler et al. | 358/158 |
| 4,313,137 | 1/1982 | Weissmueller | 358/154 |
| 4,364,091 | 12/1982 | Taguchi et al. | 358/148 |
| 4,446,483 | 5/1984 | Duijkers | 358/154 |
| 4,459,612 | 7/1984 | Shinkai et al. | 358/154 |
| 4,467,289 | 8/1984 | Okada | 330/288 |
| 4,567,444 | 1/1986 | Okanobu | 330/257 |
| 4,594,565 | 6/1986 | Barreras | 331/108 |
| 4,677,368 | 6/1987 | Bynum | 323/311 |
| 4,689,549 | 8/1987 | Davis | 323/315 |
| 4,789,896 | 12/1988 | Kishi et al. | 358/154 |
| 4,810,902 | 3/1989 | Storti et al. | 323/317 |
| 4,827,341 | 5/1989 | Akimoto et al. | 358/148 |
| 4,907,089 | 3/1990 | Yamaguchi et al. | 358/213.31 |
| 4,933,774 | 6/1990 | Ishimaru | 358/335 |
| 4,984,002 | 1/1991 | Kokubo | 358/213.13 |
| 5,038,055 | 8/1991 | Kinoshita | 327/58 |
| 5,059,820 | 10/1991 | Westwick | 307/296.6 |
| 5,070,311 | 12/1991 | Nicolai | 331/111 |
| 5,124,632 | 6/1992 | Greaves | 323/316 |
| 5,189,515 | 2/1993 | Chen | 358/157 |
| 5,250,879 | 10/1993 | Koblitz | 315/403 |
| 5,349,286 | 9/1994 | Marshall et al. | 323/315 |

(List continued on next page.)

FOREIGN PATENT DOCUMENTS

| | | | |
|---|---|---|---|
| 0465094 A2 | 1/1992 | European Pat. Off. | G05F 3/30 |
| 0698841 A1 | 2/1996 | European Pat. Off. | G05F 3/30 |
| 0735677 A1 | 10/1996 | European Pat. Off. | H03K 3/011 |

*Primary Examiner*—Michael H. Lee
*Assistant Examiner*—Jean W. Désir
*Attorney, Agent, or Firm*—Haverstock & Owens LLP

[57] ABSTRACT

A current source and threshold voltage generation circuit generates a current, through a ratio of devices, and a corresponding threshold voltage signal, to be utilized by a timing circuit for generating a timing ramp and determining when the timing ramp crosses the threshold voltage signal. The current is generated through a current generation circuit, using a ratio of matched devices. Preferably, the matched devices are transistors. The current is then utilized by a timing circuit to charge a charge storage device to a level above the level of the threshold voltage signal. The current is also mirrored, appropriately increased and used to generate the threshold voltage signal which is compared to the charge stored on the charge storage device. Accordingly, any errors in the generation of the current are also reflected in the level of the threshold voltage signal, thereby eliminating the potential for errors in the timing ramp signal generated by the timing circuit. Preferably, the charge storage device is a capacitor and the timing circuit is an HHK video circuit. The preferred embodiment of the current source and threshold voltage generation circuit is implemented within an integrated circuit and does not require any external components.

25 Claims, 5 Drawing Sheets

U.S. PATENT DOCUMENTS

| | | | |
|---|---|---|---|
| 5,394,020 | 2/1995 | Nienaber | 327/140 |
| 5,402,178 | 3/1995 | Chen | 348/529 |
| 5,420,499 | 5/1995 | DeShazo | 323/315 |
| 5,428,287 | 6/1995 | Agiman | 323/284 |
| 5,467,140 | 11/1995 | Sohn | 348/529 |
| 5,469,093 | 11/1995 | MacDonald | 327/108 |
| 5,473,243 | 12/1995 | Thomas | 323/315 |
| 5,479,091 | 12/1995 | Chloupek | 323/312 |
| 5,489,946 | 2/1996 | Kommrusch et al. | 348/528 |
| 5,502,500 | 3/1996 | Meyer | 348/525 |
| 5,565,915 | 10/1996 | Kindo et al. | 348/308 |
| 5,570,243 | 10/1996 | Mattison | 360/51 |
| 5,604,427 | 2/1997 | Kimura | 323/313 |
| 5,689,308 | 11/1997 | Nayebi et al. | 348/525 |
| 5,703,497 | 12/1997 | Min | 326/33 |
| 5,757,224 | 5/1998 | Antone et al. | 327/538 |
| 5,774,185 | 6/1998 | Nayebi et al. | 348/531 |
| 5,805,232 | 9/1998 | Ninomiya | 348/529 |
| 5,831,471 | 11/1998 | Nakajima et al. | 327/540 |
| 5,831,473 | 11/1998 | Ishil | 327/530 |
| 5,834,952 | 11/1998 | Ngo | 327/54 |
| 5,892,402 | 4/1999 | Tsubaki et al. | 332/288 |
| 5,900,773 | 5/1999 | Susak | 327/539 |

CURRENT SOURCE AND THRESHOLD VOLTAGE GENERATION METHOD AND APPARATUS FOR HHK VIDEO CIRCUIT

FIELD OF THE INVENTION

The present invention relates to the field of separating synchronization pulses from a composite video signal. More particularly, the present invention relates to the field of generating a timing current and threshold voltage for an equalization pulse removal circuit.

BACKGROUND OF THE INVENTION

A composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase locked loop to synchronize the system for displaying the next horizontal line of video information. The burst signal is used to synchronize the phase of the sampling pulses with the phase of the color subcarrier signal. Separator circuits are utilized to separate the horizontal synchronizing signal and the burst signal from the incoming video signal. The burst signal consists of a sinusoid with a frequency equal to 3.58 MHz, which is the frequency of the chrominance subcarrier $f_{sc}$. The video information signal then comprises the chrominance subcarrier having different phases amplitude-modulated with chrominance information. The composite color video signal includes both luminance and chrominance information.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This process continues until the video system reaches the bottom line on the video display.

After displaying the video information on the bottom line of the video display, a conventional video system resets itself to the top of the display in order to begin displaying the next frame. In order to allow the system to reset itself to the top of the video display a vertical blanking period is included within the composite video signal after the video information for each frame. This vertical blanking period allows the video system sufficient time to reset to the top of the video display and begin displaying the information for the horizontal lines of the next frame. Therefore, a number of horizontal periods, enough to comprise a frame or screen, are strung together, within the composite video signal. The composite video signal includes a vertical blanking period between each frame which allows the video system to perform a vertical reset and prepare to display the next frame by moving back up to the top of the video display.

During the vertical blanking period the composite video signal includes a first period of equalizing pulses, a period of serration pulses and a second period of equalizing pulses. During this vertical blanking period the video system resets itself to the top of the video display so that it is ready to begin displaying the information for the next frame. However, the video system must be notified of or be able to detect the vertical blanking period so that it can reset itself to the top of the video display. The serration pulses carry synchronization information used by the local vertical oscillator, within the video system, during a vertical reset.

The horizontal synchronizing pulses and the vertical synchronizing pulses are combined together into a composite synchronizing signal CSYNC. A device receiving this composite synchronizing signal then extracts the horizontal synchronizing pulses and the vertical synchronizing pulses from the composite signal. The equalizing and serration pulses are all generated during the vertical blanking period at a frequency equal to twice the frequency of the horizontal synchronizing pulses.

Figure 1:
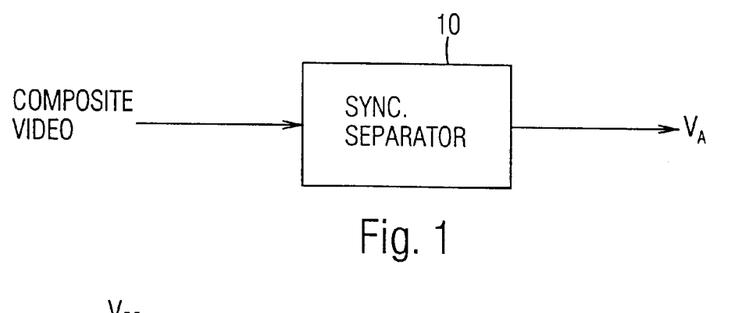
FIG. 1 illustrates a block diagram of a sync separator circuit for separating synchronization pulses from the composite video signal.

A sync separator circuit 10, as illustrated in FIG. 1, is used to separate all of the synchronization pulses from the composite video signal including the horizontal, equalizing and serration pulses. However, the sync separator circuit separates the synchronization pulses by comparing their amplitude with respect to the blank level of the signal and therefore has no way of differentiating between horizontal synchronization pulses, equalizing pulses and serration pulses. The output of the sync separator circuit is used by a horizontal phase-locked loop to lock the video system in phase with the composite video signal during the horizontal period of each frame. During the vertical blanking period, the sync separator circuit is configured to output the equalizing and serration pulses which are generated at twice the frequency of the horizontal synchronization pulses. Thus, twice as many synchronization pulses are generated during the vertical blanking period as during the horizontal period. The horizontal phase-locked loop will therefore be unable to remain locked during this period unless something is done to alter the frequency of synchronization pulses during the vertical blanking period.

Conventional circuits use precision timing signals from voltage ramps to provide a mask for the equalizing pulses. Such circuits are typically referred to as Half H Killer (HHK) circuits because the extra pulses which are removed are included halfway between adjacent horizontal synchronization pulses. The voltage ramp signals used by HHK circuits are generated by storing charge on a capacitor. Typically, the period of these ramps is relatively long, up to 64 microseconds. Accordingly, either an extremely small current or a very large capacitor are required to efficiently support a period of that length. When an extremely small current is used, small base current variations in the transistors cause large percentage differences in the small reference current, affecting the precise timing nature of the ramp circuit. External components are conventionally used to generate the necessary current and threshold voltage signals because they may be selected for high absolute accuracy. Such, external components are undesirable because they add costs to a system, take up extra space on a printed circuit board within the system and require a dedicated pin on an integrated circuit to which they are coupled. What is needed is an internal current source and a threshold voltage generation circuit capable of generating a small precise current and corresponding threshold voltage signal without the use of external components.

SUMMARY OF THE INVENTION

A current source and threshold voltage generation circuit generates a current, through a ratio of devices, and a corresponding threshold voltage signal, to be utilized by a timing circuit for generating a timing ramp and determining when the timing ramp crosses the threshold voltage signal. The current is generated through a current generation circuit, using a ratio of matched devices. Preferably, the matched devices are transistors. The current is then utilized by a timing circuit to charge a charge storage device to a level above the level of the threshold voltage signal. The current is also mirrored, appropriately increased and used to generate the threshold voltage signal which is compared to the charge stored on the charge storage device. Accordingly, any errors in the generation of the current are also reflected in the level of the threshold voltage signal, thereby eliminating the potential for errors in the timing ramp signal generated by the timing circuit. Preferably, the charge storage device is a capacitor and the timing circuit is an HHK video circuit. The preferred embodiment of the current source and threshold voltage generation circuit is implemented within an integrated circuit and does not require any external components.

DETAILED DESCRIPTION OF THE PREFERRED EMBODIMENT

Figure 2:
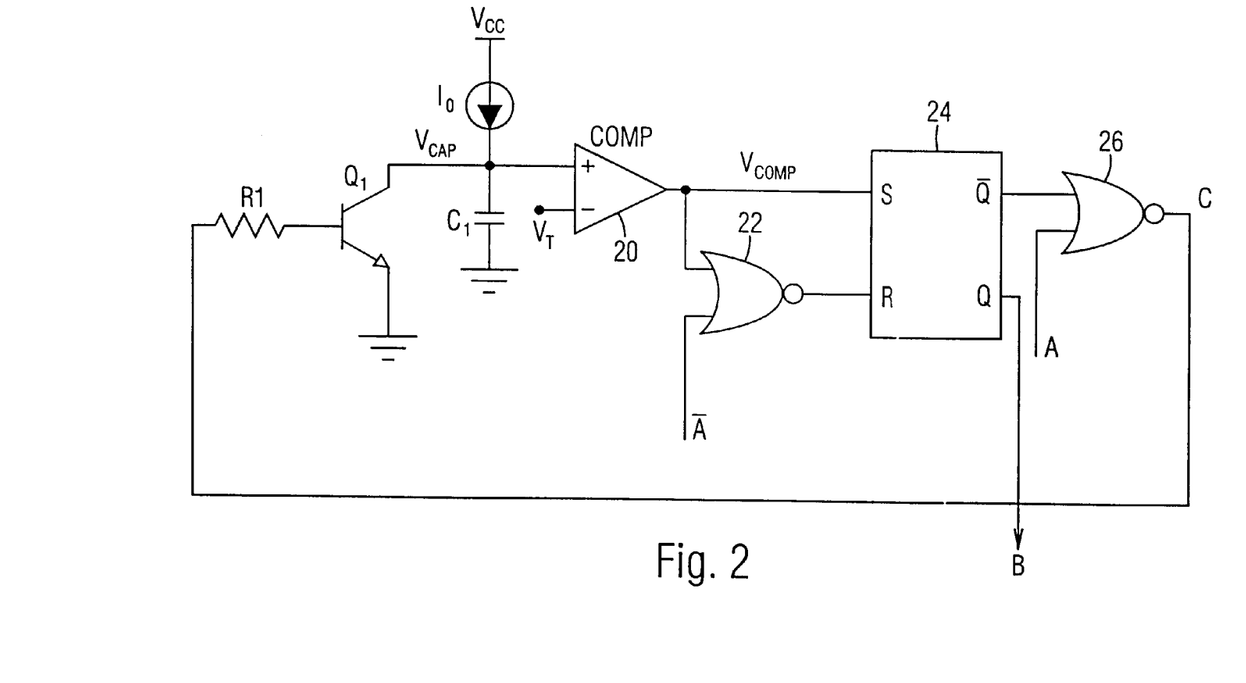
FIG. 2 illustrates a block diagram schematic of a circuit to remove every other equalizing pulse during the vertical blanking period.

A block diagram schematic of one example of a circuit for removing every other equalizing pulse during the vertical blanking period is illustrated in FIG. 2. This circuit is described in detail in U.S. Pat. No. 5,744,185, entitled "Method of and Apparatus For Removing Equalizing Pulses Without Using External Pins," which is hereby incorporated by reference. This circuit generates an output signal C representing every horizontal synchronization pulse and every other vertical synchronization pulse within the composite video signal.

The output signal C is provided as a feedback control and coupled to the first terminal of a resistor R1 within the circuit of FIG. 2. The second terminal of the resistor R1 is coupled to the base of an npn transistor Q1. The emitter of the transistor Q1 is coupled to ground. The collector of the transistor Q1 is coupled to the first terminal of a capacitor C1, to the first terminal of a current source $I_O$ and to the positive input of a comparator 20, thereby forming a voltage node $V_{Cap}$ representative of the voltage level stored across the capacitor C1. The second terminal of the capacitor C1 is coupled to ground. The second terminal of the current source $I_O$ is coupled to a supply voltage VCC. The negative input of the comparator 20 is coupled to a threshold voltage signal $V_T$.

An output signal $V_{Comp}$ of the comparator 20 is coupled as the set input S of an RS latch 24 and as the input to a logical NOR gate 22. The output signal A from a sync separator circuit, such as the sync separator circuit 10 illustrated in FIG. 1, is coupled as an input to a logical NOR gate 26. The inverse signal $\overline{A}$ which is the inverse of the output signal A from the sync separator circuit 10 is coupled as an input to the logical NOR gate 22. The output of the logical NOR gate 22 is coupled as the input R of the RS latch 24. The output Q of the RS latch 24 provides a signal B. The inverse output $\overline{Q}$ of the RS latch 24 is coupled as an input to the logical NOR gate 26. The output of the logical NOR gate 26 provides the output signal C which is the output of the circuit to remove equalizing pulses during a vertical blanking period.

Timing diagrams of relevant signals within the circuits illustrated in FIGS. 1 and 2 are illustrated in FIG. 3. The composite video signal which is input to the sync separator circuit 10 is illustrated in FIG. 3a. The signal A which is output from the sync separator in response to the composite video signal is illustrated in FIG. 3b. The voltage signal $V_{Cap}$ which represents the voltage level stored across the capacitor C1 is illustrated in FIG. 3c. The output signal $V_{Comp}$ of the comparator 20 is illustrated in FIG. 3d. The signal B which represents the output Q of the RS latch 24 is illustrated in FIG. 3e. The output signal C which represents the output of the circuit from which every other equalizing pulse is removed during the vertical blanking period is illustrated in FIG. 3f. The timing diagrams illustrated in FIG. 3 are shown to correspond in time to each other.

Figure 3A:
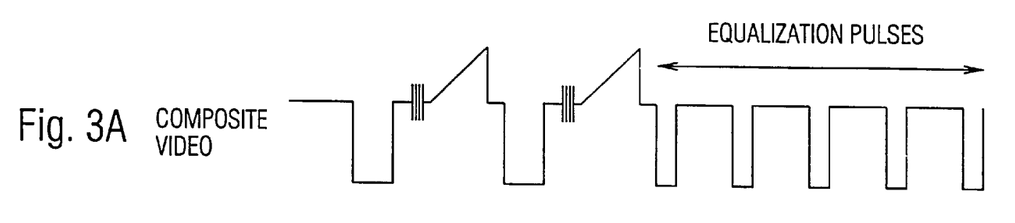
FIG. 3a illustrates a timing diagram of a composite video signal.
Figure 3B:
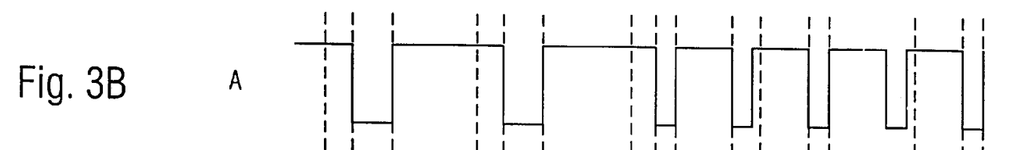
FIG. 3b illustrates a timing diagram of an output of the sync separator circuit illustrated in FIG. 1.
Figure 3C:
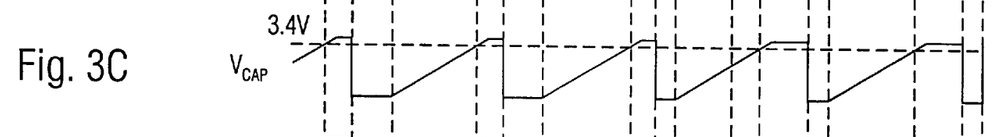
FIG. 3c illustrates a timing diagram of a voltage signal $V_{Cap}$ which represents a voltage level stored across a capacitor C1.
Figure 3D:
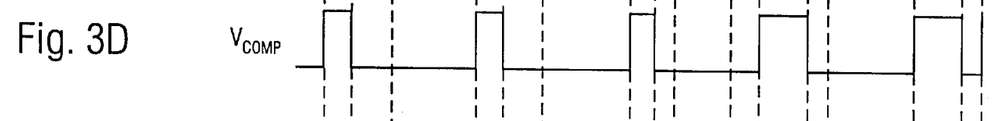
FIG. 3d illustrates a timing diagram of an output $V_{Comp}$ of a comparator 20.
Figure 3E:
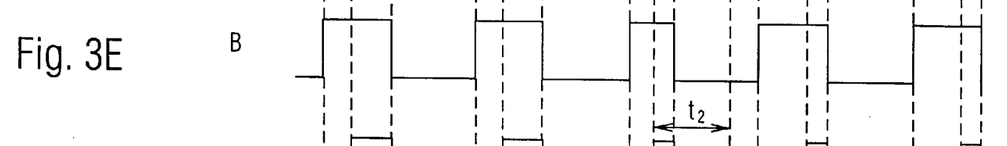
FIG. 3e illustrates a timing diagram of a signal B which represents an output Q of an RS latch 24.
Figure 3F:
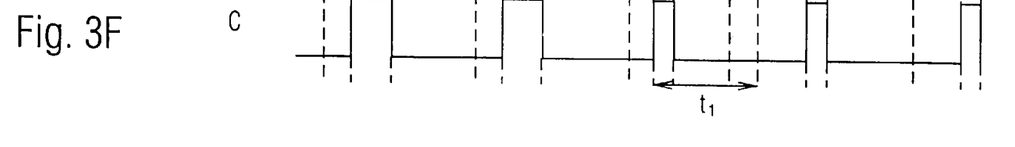
FIG. 3f illustrates a timing diagram of an output signal C of the circuit of the present invention.

The composite video signal illustrated in FIG. 3a includes two horizontal periods followed by five equalization pulses during a vertical blanking period at the end of a frame. The output signal A from the sync separator circuit illustrated in FIG. 3b represents only the synchronization pulses from the composite video signal. The output signal A and the inverse signal $\overline{A}$ are then input to the circuit to remove equalizing pulses during a vertical blanking period, illustrated in FIG. 2.

The outputs of the logical NOR gates 22 and 26 are at a logical low voltage level when either of their inputs are at a logical high voltage level. The outputs of the logical NOR gates 22 and 26 are at a logical high voltage level only when both of their inputs are at a logical low voltage level. On the rising edge of the output signal A, when the output signal A transitions from a logical low voltage level to a logical high voltage level, the output signal C will fall to a logical low voltage level, turning off the transistor Q1. When the transistor Q1 is turned off the capacitor C1 is charged by the current source $I_O$. When the voltage level $V_{Cap}$ stored across the capacitor C1 is greater than the level of the threshold voltage $V_T$, the output signal $V_{Comp}$ of the comparator 20 will rise to a logical high voltage level. When the output signal $V_{Comp}$ of the comparator 20 rises to a logical high voltage level, the RS latch 24 is set, causing the output Q to rise to a logical high voltage level and the inverse output $\overline{Q}$ to fall to a logical low voltage level. Because the inverse output $\overline{Q}$ is at a logical low voltage level, at the next falling edge of the output signal A from the sync separator 10, where the output signal A transitions from a logical high voltage level to a logical low voltage level, the output signal C will rise to a logical high voltage level.

When the output signal C rises to a logical high voltage level, the transistor Q1 is turned on and provides a discharge path for the capacitor C1. Because the voltage level $V_{Cap}$, stored across the capacitor C1, is discharged below a level equal to the level of the threshold voltage $V_T$, the output signal $V_{Comp}$ of the comparator 20 transitions from a logical high voltage level to a logical low voltage level. Because the inverse output signal $\overline{A}$ is at a logical high voltage level the output of the logical NOR gate 22 remains at a logical low voltage level and the output Q of the RS latch 24 will remain at a logical high voltage level. The inverse output $\overline{Q}$ of the RS latch 24 will correspondingly remain at a logical low voltage level, causing the output signal C to remain at a logical high voltage level until the output signal A from the sync separator circuit 10 rises to a logical high voltage level.

When the output signal A from the sync separator circuit 10 rises to a logical high voltage level at the end of the synchronization pulse, the output signal C transitions from a logical high voltage level to a logical low voltage level. Because the RS latch 24 was previously set and has not yet been reset, the output signal C will transition when the output signal A from the sync separator circuit 10 transitions. Thus, the width of the pulses of the output signal C is equal to the width of the synchronization pulses from the output signal A.

When the output signal C falls to a logical low voltage level, the transistor Q1 is turned off and causes the voltage level $V_{Cap}$ stored across the capacitor C1 to begin charging up again. When the voltage level $V_{Cap}$ stored across the capacitor C1 rises above the level of the threshold voltage $V_T$, the output $V_{Comp}$ of the comparator 20 will rise to a logical high voltage level, again setting the RS latch 24. The output signal C will then rise to a logical high voltage level at the beginning of the next synchronization pulse from the output signal A and will fall to a logical low voltage level at the end of the next synchronization pulse.

The values of the capacitor C1 and the current source $I_O$ have been chosen such that during the horizontal period, the voltage level $V_{Cap}$ stored across the capacitor C1 will reach the level of the threshold voltage $V_T$ before every horizontal synchronization pulse and set the RS latch so that the output signal C will transition at the beginning of the next pulse. However, during the vertical blanking period, when the synchronization pulses have a frequency twice as fast as the horizontal synchronization pulses, when the capacitor C1 begins charging at the end of a pulse, the voltage level $V_{Cap}$ stored across the capacitor C1 will not reach the level of the threshold voltage $V_T$ before the next pulse. Therefore, the RS latch 24 will not be set and the output signal C will not transition during that next pulse. However, the voltage level $V_{Cap}$ stored across the capacitor C1 will reach the level of the threshold voltage $V_T$ before the subsequent pulse, setting the RS latch 24 and allowing the output signal C to transition with the edges of that pulse.

The timing of the setting of the RS latch 24 is illustrated in FIG. 3. The time necessary for the voltage level $V_{Cap}$ stored across the capacitor C1 to reach the level of the threshold voltage $V_T$ from a completely discharged level, is illustrated as the time period t1. The time between two equalization pulses during a vertical blanking period is illustrated as the time period t2. The values of the capacitor C1 and the current source $I_O$ have been chosen so that the time period t1 is greater than the time period t2, but less than the time between two horizontal synchronization pulses. Therefore, as described above, during the vertical blanking period every other pulse is ignored by the circuit of FIG. 2.

Figure 4:
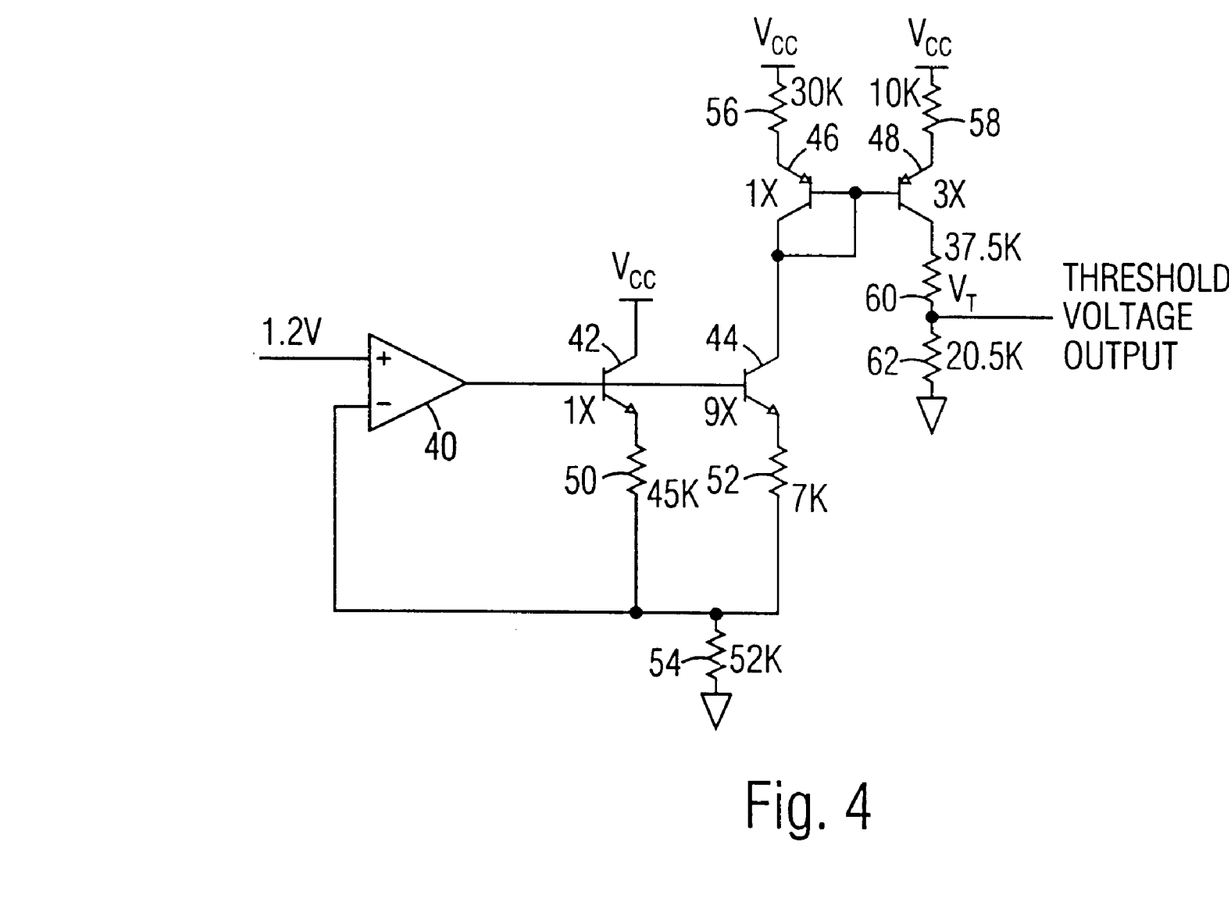
FIG. 4 illustrates a schematic diagram of a current source and threshold voltage generation circuit according to the present invention.

A current source and threshold voltage generation circuit according to the present invention is illustrated in FIG. 4. The current source and threshold voltage generation circuit generates a small current, using a ratio of devices, and a threshold voltage signal, which are utilized by an HHK circuit, as illustrated in FIG. 2. The small current is generated through a current generation circuit, using a ratio of matched devices. That current is then utilized by the HHK circuit, as the current provided from the current source $I_O$, to charge the capacitor C1, as described above. The current is also mirrored and used to generate the threshold voltage which is compared to the voltage across the capacitor C1. Accordingly, any errors in the current are reflected in the threshold voltage and therefore cancel out and do not change the length of the time period for blocking equalization pulses. If an error causes less current to be supplied to the capacitor C1, then the threshold voltage level is reduced by an appropriate amount. Correspondingly, if an error causes more current to be supplied to the capacitor C1, then the threshold voltage level is increased by an appropriate amount.

Within the generation circuit of FIG. 4, a 1.2 V bandgap reference voltage signal is coupled to a positive input of an amplifier 40. An output of the amplifier 40 is coupled to a base of an npn transistor 42 and to a base of an npn transistor 44. A collector of the transistor 42 is coupled to the supply voltage VCC. An emitter of the transistor 42 is coupled to a first terminal of a resistor 50. An emitter of the transistor 44 is coupled to a first terminal of a resistor 52. A second terminal of the resistor 52 is coupled to a first terminal of a resistor 54, to a second terminal of the resistor 50 and to a negative input of the amplifier 40. A second terminal of the resistor 54 is coupled to ground.

A collector of the transistor 44 is coupled to a collector and base of a pnp transistor 46 and to a base of a pnp transistor 48. An emitter of the transistor 46 is coupled to a first terminal of a resistor 56. A second terminal of the resistor 56 is coupled to the supply voltage VCC. An emitter of the transistor 48 is coupled to a first terminal of a resistor 58. A second terminal of the resistor 58 is coupled to the supply voltage VCC. A collector of the transistor 48 is coupled to a first terminal of a resistor 60. A second terminal of the resistor 60 is coupled to a first terminal of a resistor 62, thereby forming an output node from which the threshold voltage signal is provided. A second terminal of the resistor 62 is coupled to ground.

In operation, the amplifier 40 mirrors the 1.2 V bandgap reference level at the negative input and therefore at the first terminal of the resistor 54. Therefore, there is a 1.2 V voltage drop across the resistor 54. In the preferred embodiment of the present invention, the resistor 54 has a value equal to 52 K ohms. Preferably, a current equal to 23 microamps is generated through the resistor 54. This current is supplied through the split pair of transistors 42 and 44. Preferably, the transistor 44 has an emitter which is nine times bigger than the emitter of the transistor 42. The emitter resistors 50 and 52 have also been chosen to approximate the ratios of the emitters of the transistors 42 and 44 based on the total value of the resistor 54. However, in the preferred embodiment of the present invention, the resistor 52 is not exactly one-tenth (¹⁄₁₀) and the resistor 50 is not exactly nine-tenths (⁹⁄₁₀) of the value of the resistor 52, in order to compensate for base current losses within the system. Accordingly, one-tenth (1/10) of the current flowing through the resistor 54 is supplied through the transistor 42 and flows through the resistor 50. In the preferred embodiment of the present invention this current supplied through the transistor 42 is equal to 2.3 microamps. This current is then mirrored and used as the reference current supplied from the current source $I_O$ to charge the capacitor C1 within the timing ramp generation circuit, as described above.

In order to compensate for any mismatch in the amplifier 40 caused by low beta transistors and the use of such a small output current, the current supplied through the corresponding transistor 44 is used to generate the threshold voltage signal used by the timing ramp circuit and compared against the voltage stored on the capacitor C1 to trigger transitions of the output signal $V_{Comp}$ from the comparator 20. Accordingly, any errors in the current through the transistor 42 are reflected in the threshold voltage, thereby eliminating the potential for errors in the timing ramp signal generated by the circuit to remove equalizing pulses during a vertical blanking period. If the level of the current is reduced or increased by errors within the circuit, the threshold voltage level is correspondingly reduced or increased by an appropriate amount to compensate for those errors and maintain the correct timing period when the voltage across the capacitor C1 rises above the threshold voltage level.

The current flowing through the transistor 44, which represents a current which is nine times greater than the current supplied to the capacitor C1, flows through the transistor 46 and is mirrored through the transistor 48. Because the size of the transistor 48 is three times greater than the size of the transistor 46, the current flowing through the transistor 48 is three times greater than the current flowing through the transistor 46. The current flowing through the transistor 48 is then provided to a resistor ladder including the resistors 60 and 62. The threshold voltage signal VT is provided from the output node between the resistors 60 and 62 and accordingly represents the voltage drop across the resistor 62.

The current which flows through the resistor 62 and which is used to generate the threshold voltage signal $V_T$ corresponds to the current supplied from the current source 10, which mirrors the current flowing through the transistor 42. Accordingly, any errors in the level of the current flowing through the transistor 42 are reflected in the current flowing through the transistor 48 and the resistor 62 and ultimately in the level of the threshold voltage signal $V_T$. Therefore, as the level of the current supplied from the current supply $I_O$ varies, the level of the threshold voltage signal $V_T$ will correspondingly vary by a proportionate amount, ensuring that the timing ramp generated by the voltage stored across the capacitor C1 will cross the threshold voltage level at the appropriate time interval, regardless of any errors within the current supplied from the current source $I_O$.

Figure 5A:
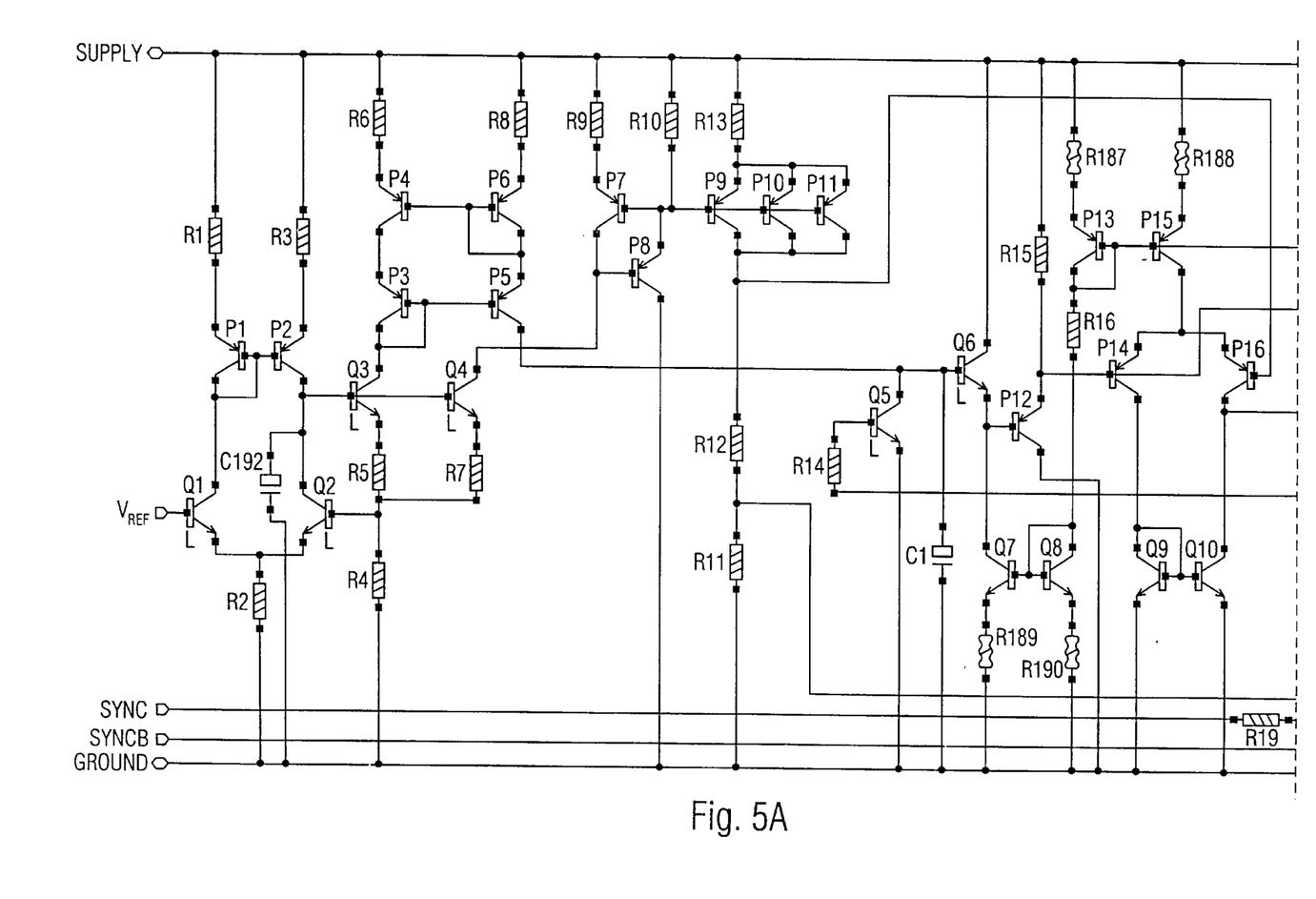
FIG. 5 illustrates a detailed schematic diagram of the current source and threshold voltage generation circuit according to the present invention.
Figure 5B:
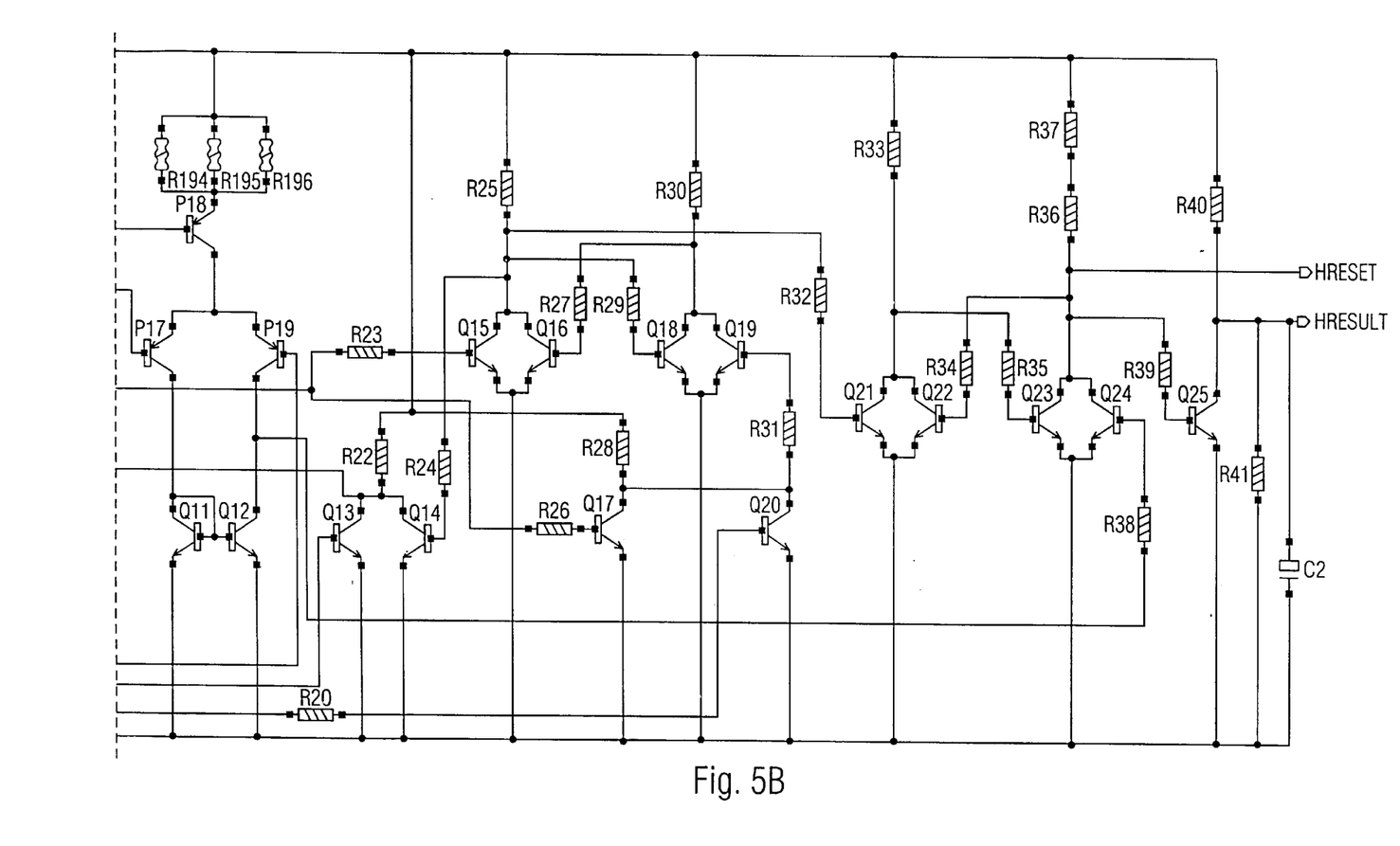

The current and threshold voltage circuit of FIG. 4 is preferably implemented within an integrated circuit and therefore does not require the use of any external precision components, thereby conserving space within the system. A detailed circuit schematic of the preferred embodiment of the current source and threshold voltage circuit of the present invention is illustrated in FIG. 5. The preferred embodiment of the present invention is implemented within an analog video encoder circuit, Part No. CXA2015Q, which will be available from Sony Corporation of America, 3300 Zanker Road, San Jose, Calif. 95134.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the current source and voltage generation circuit is included within an HHK circuit, that such a circuit could be utilized within any timing circuit. It will also be apparent to those skilled in the art that the values of the components used within the preferred embodiment of the present invention, may also be changed or varied without departing from the spirit and scope of the invention.

We claim:

1. A current source and threshold voltage generation apparatus for supplying an output current and corresponding threshold voltage signal, comprising:

a. a current generation circuit for generating a first current;

b. a first plurality of devices through which the first current is supplied, each of the devices having a corresponding size, wherein a ratio of the sizes of the devices determines an amount of current flowing through each of the devices and a total amount of current flowing through the devices is equal to the first current and further wherein an output current having a value different than the first current is generated to correspond to the current flowing through a predetermined one of the devices; and c. a voltage generation circuit coupled to the first plurality of devices for generating a threshold voltage signal corresponding to the output current so that any variations within the output current are proportionately reflected within the threshold voltage signal.

2. The apparatus as claimed in claim 1 wherein the current generation circuit includes a first resistor and an amplifier coupled to receive a first predetermined voltage signal and to provide a voltage drop across the first resistor.

3. The apparatus as claimed in claim 2 wherein the voltage drop across the first resistor corresponds to the first predetermined voltage signal.

4. The apparatus as claimed in claim 1 wherein the plurality of devices includes a first current supply circuit for supplying a first predetermined portion of the first current and a second current supply circuit for supplying a second predetermined portion of the first current, wherein together the first and second predetermined portions equal the first current and a ratio of the first current supply circuit to the second current supply circuit determines values of the first and second predetermined portions of the first current.

5. The apparatus as claimed in claim 4 wherein the output current is generated to correspond to the first predetermined portion of the first current.

6. The apparatus as claimed in claim 5 wherein the voltage generation circuit includes a current mirror circuit which mirrors the second predetermined portion of the first current, thereby forming a mirrored current which is used to generate the threshold voltage signal.

7. The apparatus as claimed in claim 6 wherein the mirrored current is also stepped up to be proportionately greater than the second predetermined portion of the first current.

8. The apparatus as claimed in claim 7 wherein the current source and threshold voltage generation apparatus is included within an integrated circuit without requiring any external components to provide the output current.

9. A method of generating an output signal representative of every horizontal synchronization pulse and every other vertical synchronization pulse included within a composite video signal, comprising the steps of:
   a. receiving a signal representative of all synchronization pulses within a composite video signal, including horizontal and vertical synchronization pulses;
   b. generating an output signal representative of synchronization pulses within the signal, the output signal having a first logical voltage level and a second logical voltage level;
   c. raising a level of charge stored across a storage element when the output signal is at the first logical voltage level using a current source which provides an output current by generating a first current through a first device, wherein the first current is supplied through second and third devices, a ratio of the second and third devices determining a value of current flowing through each of the second and third devices, and further wherein the output current corresponds to the current flowing through the second device;
   d. discharging a level of charge stored across the storage element when the output signal rises to the second logical voltage level; and
   e. generating a threshold voltage signal corresponding to the output current so that any variations within the output current are proportionately reflected within the threshold voltage signal;
wherein the step of generating an output signal is only enabled when the level of charge is above the threshold voltage signal, and further wherein the level of charge rises above the threshold voltage signal to enable the step of generating an output signal to include within the output signal pulses representative of every horizontal synchronization pulse and every other vertical synchronization pulse.

10. The method as claimed in claim 9 wherein the second device includes a second transistor and the third device includes a third transistor and further wherein relative sizes of the second transistor to the third transistor provide the ratio and thereby determine the values of the current flowing through the second and third devices.

11. The method as claimed in claim 10 wherein the step of generating a threshold voltage signal includes mirroring the current flowing through the third device thereby forming a mirrored current and generating the threshold voltage signal using the mirrored current.

12. The method as claimed in claim 11 wherein the mirrored current is proportionately greater than the current flowing through the third device.

13. An apparatus for generating an output signal representative of every horizontal synchronization pulse and every Nth vertical synchronization pulse within a composite video signal, wherein a first time period occurs between horizontal synchronization pulses and a second time period occurs between N vertical synchronization pulses, the apparatus comprising:

a. a storage element for storing a level of charge;
b. a charge supply circuit coupled to the storage element for raising the level of charge, the charge supply circuit including a current source which provides an output current by generating a first current through a first device, wherein the first current is supplied through second and third devices, a ratio of the second and third devices determining a value of current flowing through each of the second and third devices, and further wherein the output current corresponds to the current flowing through the second device;
c. a voltage generation circuit coupled to the charge supply circuit for generating a threshold voltage signal corresponding to the output current so that any variations within the output current are proportionately reflected within the threshold voltage signal;
d. a monitoring circuit coupled to the storage element and to the voltage generation circuit for determining when the level of charge is above a level of the threshold voltage signal, wherein the charge supply circuit will raise the level of charge above the level of the threshold voltage signal in a third time period; and
e. an output generating circuit coupled to the monitoring circuit for generating an output pulse signal representative of the horizontal and vertical synchronization pulses, wherein the output pulse signal is only generated when the level of charge is above the level of the threshold voltage signal.

14. The apparatus as claimed in claim 13 wherein the third time period is less than the first time period but greater than the second time period such that the level of charge rises above the level of the threshold voltage signal for generating the output pulse signal to correspond to every horizontal synchronization pulse and every Nth vertical synchronization pulse within the composite video signal.

15. The apparatus as claimed in claim 14 wherein the second device includes a second transistor and the third device includes a third transistor and further wherein relative sizes of the second transistor to the third transistor provide the ratio and thereby determine the values of the current flowing through the second and third devices.

16. The apparatus as claimed in claim 15 wherein the voltage generation circuit includes a current mirror circuit which mirrors the current flowing through the third device, thereby forming a mirrored current which is used to generate the threshold voltage signal.

17. The apparatus as claimed in claim 16 wherein the storage element is a capacitor.

18. The apparatus as claimed in claim 17 wherein the first time period is twice as long as the second time period.

19. The apparatus as claimed in claim 18 wherein the apparatus is included within an integrated circuit and the capacitor is also included within the integrated circuit.

20. The apparatus as claimed in claim 19 wherein the output pulse signal is coupled as a feedback signal to control the charge supply circuit.

21. A current source and threshold voltage generation apparatus for supplying a current and a threshold voltage signal to a timing circuit for generating a charge across a storage element and comparing the charge to the threshold voltage signal, comprising:
   a. a first resistor;
   b. an amplifier coupled to receive a first predetermined voltage signal and to provide a voltage drop across the first resistor, thereby generating a first current;
   c. a first current supply circuit coupled to the first resistor for supplying a second current;

d. a second current supply circuit coupled to the first resistor for supplying a third current, wherein together the second and third currents equal the first current and a ratio of the first current supply circuit to the second current supply circuit determines values of the second and third currents and further wherein an output current is generated to correspond to the second current; and e. a voltage generation circuit coupled to the second current supply circuit for generating a threshold voltage signal corresponding to the output current so that any variations within the output current are proportionately reflected within the threshold voltage signal.

22. The apparatus as claimed in claim 21 wherein the first current supply circuit includes a first transistor and the second current supply circuit includes a second transistor and further wherein relative sizes of the first transistor to the second transistor provide the ratio and thereby determine the values of the second and third currents.

23. The apparatus as claimed in claim 22 wherein the voltage generation circuit includes a current mirror circuit which mirrors the third current, thereby forming a mirrored current which is used to generate the threshold voltage signal.

24. The apparatus as claimed in claim 23 wherein the mirrored current is also stepped up to be proportionately greater than the third current.

25. The apparatus as claimed in claim 24 wherein the current source and threshold voltage generation apparatus is included within an integrated circuit without requiring any external components to provide the output current and threshold voltage signal.

* * * * *

UNITED STATES PATENT AND TRADEMARK OFFICE
CERTIFICATE OF CORRECTION

PATENT NO.   : 6,018,370

DATED        : January 25, 2000

INVENTOR(S)  : Nayebi et al.

It is certified that error appears in the above-identified patent and that said Letters Patent is hereby correct as shown below:

In column 3, line 56, please delete "U.S. Pat. No. 5,744, 185" after "described in detail in" and insert -- U.S. Pat. No. 5,774,185 -- therein.

In column 7, line 36, please delete "VT" before "is provided from" and insert -- $V_T$ -- therein.

In column 7, line 41, please delete "10" after "current source" and insert -- $I_o$ -- therein Signed and Sealed this Twenty-sixth Day of September, 2000

Attest:

Q. TODD DICKINSON

*Attesting Officer*          *Director of Patents and Trademarks*